H. GROSS.
Manure Hook or Drag.

No. 90,526.  Patented May 25, 1869.

Witnesses.
Edwin James
H. G. Holmead

Inventor.
Henry Gross
per J. E. F. Holmead
Attorney

United States Patent Office.

HENRY GROSS, OF MIDDLETOWN, PENNSYLVANIA.

Letters Patent No. 90,526, dated May 25, 1869.

---

IMPROVEMENT IN MANURE-HOOK OR DRAG.

---

The Schedule referred to in these Letters Patent and making part of the same.

---

*To all whom it may concern:*

Be it known that I, HENRY GROSS, of Middletown, in the county of Dauphin, and State of Pennsylvania, have invented certain new and useful Improvements in Manure-Hooks, or Drags; and I do hereby declare that the following is a full, clear, and exact description of the same, reference being had to the accompanying drawing, and to the letters of reference marked thereon, making part of this specification, in which—

This invention is an improvement on the patent granted to Gross and Stoll, December 8, 1868, for a manure-drag, and its object is to furnish a simple and practical drag, or hook, and is so arranged that the main shaft, to which is attached the tines, is allowed to swing freely in its bearings, whereby the load of manure can, with the utmost facility, be dropped at any desired point. After the load has been dropped, the tines can be immediately thrown in position to collect another load; or, if desired, they can be left perfectly free, when the slightest draught on the part of the horse will throw them in a position nearly parallel with the main beam, in which condition the drag can readily be drawn, passing, as it will, freely over all obstructions.

To accomplish this, I cut away the upper face of the rear section of the main beam, so as to leave a recess, in which fits a trap-lever plate. This plate is nearly triangular in form. Its front edge is hinged to the main beam, and at its point of attachment is flush with the sides and upper face of the same.

This plate being triangular in form, its rear section projects over the sides of the main beam, which furnishes bearing-surfaces for the ears that are attached to the tine-shaft, and by means of which the shaft and tines are held and firmly locked in position, when desired.

To the upper surface of this trap-plate is attached a swan-neck handle, by means of which the plate can be lifted at pleasure, and the tine-shaft allowed to revolve, to drop the load, or for any other purposes.

Figure 1:
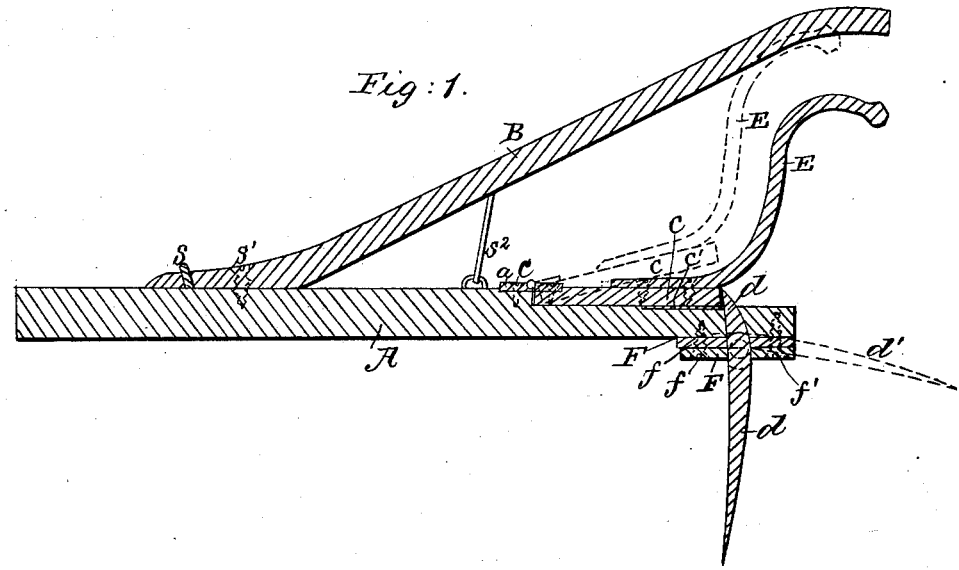
Figure 1 is a horizontal sectional view, with the tines in place.

The tine-shaft is secured in suitable bearing-plates on the under side of the beam, and is provided with ears, which, when in position as shown in fig. 1, securely lock the shaft, and enable the drag to collect the manure.

To enable others skilled in the art to make and use my invention, I will now proceed to describe its construction and operation.

A is the main beam, and is made of wood, slightly tapering in form.

To this main beam A, by means of staple $b$, screws $b^1$ $b^1$, and V-shaped bearing-rod $b^2$, or equivalent devices, I secure the handles B B.

The rear section of the upper surface of the main beam A is cut away, as clearly shown in fig. 1, leaving a shoulder, $a$.

Against this shoulder rests the forward end of the trap-lever plate C.

Figure 2:
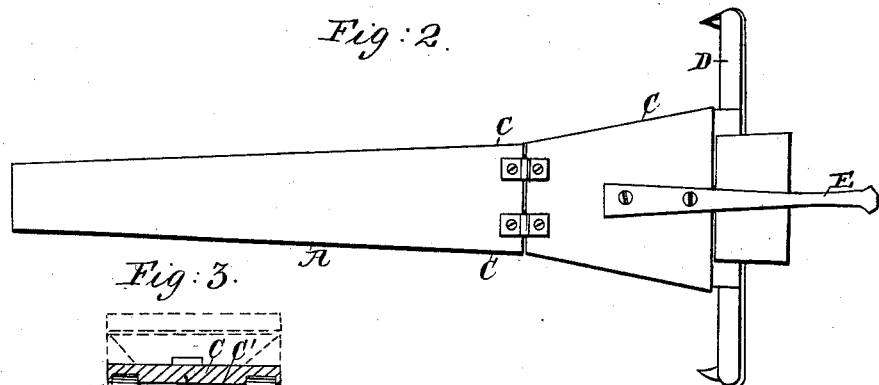
Figure 2 is a top view of the main beam, showing the method of hinging the trap-lever plate.

This plate C is secured to the main beam by means of hinges $c$ $c$, as clearly shown in fig. 2, and is nearly triangular in form.

Figure 3:
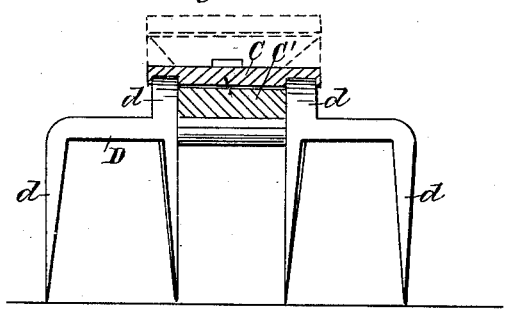
Figure 3 is an end view.

Thus, while it is flush with the top and sides of the beam at its point of contact with the shoulder $a$, its rear end projects over the sides of the beam, thus furnishing bearing-surfaces for the ears $d$ $d$ of the tine-shaft D, by means of which it is locked and held in position, as clearly shown in fig. 3.

E is a swan-neck handle, and is made of metal, and attached to the upper surface of the plate C, and by means of which said plate can be raised at pleasure.

D is the tine-shaft, and is made of metal, and provided with four or more tines, $d'$ $d'$.

This shaft D works freely in bearing-plates F and F', secured, by screws $f$ $f$, on the under side of the main beam A.

This shaft D is provided with ears $d$ $d$ on its upper surface, which, bearing against the trap-plate C, hold the shaft and tines in the position shown in blue in the drawing.

The under bearing-plate F' of the shaft is provided with lips, or flanges $f'$ $f'$, on which rest the ears $d$ $d$, when the tines are in the position shown in red in fig. 1.

The under surface and edge of the plate C may be covered with a thin metal plate, $c'$, which will prevent its wear, and consequently add to its durability.

The operation is as follows:

The drag is in position as shown in fig. 1. The draught being applied, the manure will be collected. When a sufficient quantity is held by the tines, simply lift the handle E, when the trap-plate will be in position shown in red in fig. 1, and the slightest movement on the part of the animal attached to the drag will throw the shaft and tines in the position also shown in red in fig. 1, when the load will be dropped, and the tines can be returned to collect another load, or allowed to drag in the rear of the beam, and in position nearly parallel with the same, in which condition it can readily be moved from the stable to the field, or transported from one locality to another.

Having thus fully described my invention,

What I claim therein as new, and desire to secure by Letters Patent of the United States, is—

1. Locking the tine-shaft of a manure-drag by means of a trap-lever plate, when the same is hinged to the main beam, and works in a recess formed in the upper surface of the same, substantially as described, as and for the purpose specified.

2. The trap-lever plate C, and handle E, when the same are arranged in combination with a tine-shaft, D, having ears *d d*, substantially as described, as and for the purposes specified.

In testimony whereof, I have signed my name to this specification, in the presence of two subscribing witnesses.

HENRY GROSS.

Witnesses:
 BENJAMIN S. PETERS,
 J. SCHAEFFER.